Sept. 15, 1964 L. PERAS 3,148,555
AUTOMATIC CHAIN-TIGHTENERS
Filed Oct. 15, 1962
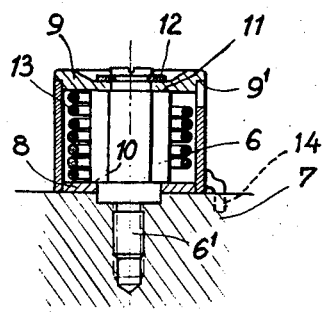
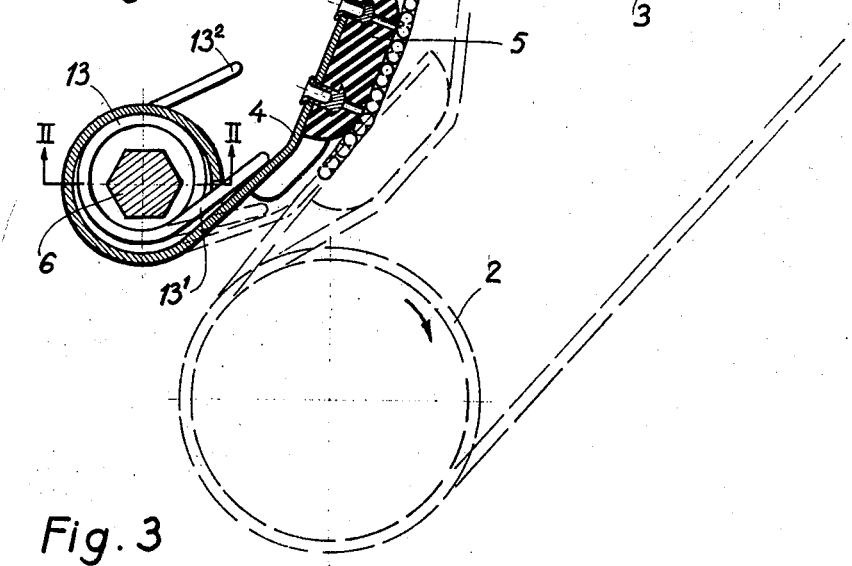
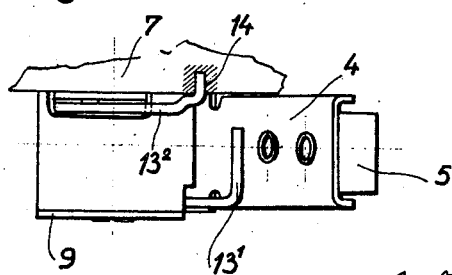
Inventor
Lucien Peras
By Stevens, Davis, Miller & Mosher
Attorneys

3,148,555
AUTOMATIC CHAIN-TIGHTENERS
Lucien Peras, Billancourt (Seine), France, assignor to Regie Nationale des Usines Renault, Billancourt, Seine, France
Filed Oct. 15, 1962, Ser. No. 230,658
Claims priority, application France, Oct. 19, 1961, 876,424
2 Claims. (Cl. 74—242.11)

The present invention relates to automatic chain-tighteners or adjusters of the type comprising an arm carrying a bearing member adapted to engage the chain, this arm having a pivot pin about which it is urged angularly by a chain-tensioning spring.

This invention is concerned more particularly with a specific construction of a chain-tightener of this general type, which is of simple design, has relatively small overall dimensions and is easy to mount.

This invention is remarkable notably in that said pivot pin and the arm portion surrounding same constitute the component elements of an annular casing receiving the turns of the chain-tensioning spring.

This invention is also concerned with simple means permitting in this case the non-return or unidirectional operation of the arm in a chain-tightener of the general type set forth hereinabove.

A specific form of embodiment of a chain-tightener according to this invention will now be described with reference to the accompanying drawing wherein:

FIGURE 1 is a diagrammatic part-sectional and elevational view showing the chain-tightener of this invention in its operative position;

FIGURE 2 is a section taken upon the line II—II of FIG. 1, and

FIGURE 3 is a plan view from above showing the chain-tightener in its operative position.

Referring first to FIG. 1, the arrangement illustrated comprises a chain transmission 1 extending between two drivingly interconnected wheels or sprockets 2, 3 for example of the type conventional for driving the valve gear in internal combustion engines, the driving wheel being designated by the reference numeral 2 and revolving in the direction of the arrow, the chain-tightener being designed for tensioning the idle span of the chain.

The chain-tightener illustrated comprises an arm 4 carrying a friction shoe 5 secured thereon by riveting or cementing.

The arm 4 is pivoted on the chain-tightener mounting support or fixed part which comprises a pivot pin 6 formed with a screw-threaded end portion $6^1$ permitting its fixation in a corresponding tapped hole in the cylinder block 7 of the engine. This arm 4 consists of a metal strip having one end wound to a substantially cylindrical shape and centred by means of a pair of adequate washers 8, 9 threaded and axially spaced on the pivot pin 6 against shoulders 10 and 11.

The washer 9 is also designed to hold the arm 4 against axial movement by means of its shoulder $9^1$, and is in turn held in proper axial position by a snap ring 12.

The wound end portion of arm 4 constitutes with the pivot pin 6 and the washers 8, 9 an annular casing or housing containing the turns of the chain-tensioning spring 13 but permitting the passage of the end portion $13^1$ of this spring which bears on the arm 4, as well as the other end portion $13^2$ formed with a hook or like bent portion adapted to engage a hole 14 in the cylinder block 7 (see FIG. 3).

Of course, it would not constitute a departure from the basic principle of the invention to provide a mounting support and a chain-tightener arm designed to constitute by themselves the casing receiving the chain-tensioning spring. Moreover, this chain-tightener may be designed to provide the aforesaid non-return feature set forth hereinabove.

In this case, the arm 4 or at least its wound portion consist of spring metal tightly mounted on its mounting support and arranged as shown in the drawing so that the chain reaction tending to move the chain-tightener outwards urges the arm in the winding direction. Thus, any force tending to wind the arm 4 will produce a setting between the wound arm portion and the washers 8, 9, whereby the chain-tightener will operate unidirectionally or like a non-return device. Of course, in this case the washers 8, 9 must be held against rotation about the pivot pin 6, for example by force-fitting or prismatic engagement of male and female parts.

While the present invention has been described in conjunction with two preferred forms of embodiment, it is to be understood that modifications and variations may be resorted to without departing from the spirit and scope of the invention, as those skilled in the art will readily understand. Such modifications and variations are considered to be within the purview and scope of the invention and appended claims.

I claim:
1. A tensioning device for a transmission chain, belt or like flexible member comprising an arm having mounted on one end an abutting means adapted to engage said transmission chain, the other end of said arm being formed into a substantially annular housing, pivot pin means around which said annular housing is disposed, said pivot pin means including means to maintain said annular housing in a clamped position so that the transmission chain reaction tending to move the tensioning device outwards urges said arm in a winding direction, and spring means disposed in said annular housing and having an end portion engaging said arm to urge said abutting means into tensioning engagement with the transmission chain.

2. A tensioning device according to claim 1 wherein said maintaining means of said pivot pin means include two washer members rigidly mounted on said pivot pin means in spaced relationship, each washer member engaging a corresponding end of said annular housing.

References Cited in the file of this patent
UNITED STATES PATENTS

| | | |
|---|---|---|
| 660,570 | Green | Oct. 30, 1900 |
| 1,675,671 | Stein | July 3, 1928 |
| 2,130,571 | Weller | Sept. 20, 1938 |
| 2,139,397 | Wigglesworth | Dec. 6, 1938 |
| 2,575,313 | Covert et al. | Nov. 13, 1951 |